United States Patent [19]
Shimogori et al.

[11] Patent Number: 5,752,335
[45] Date of Patent: May 19, 1998

[54] IDENTIFICATION DEVICE FOR PETS

[76] Inventors: Kotaro Shimogori; Mary Jeanne Thompson Shimogori, both of 600 Flower Avenue, Ste. 3, Venice, Calif. 90291

[21] Appl. No.: 741,821

[22] Filed: Oct. 31, 1996

[51] Int. Cl.⁶ .................................................. G09F 3/00
[52] U.S. Cl. .............................................. 40/300; 40/906
[58] Field of Search ............................... 63/23; 40/300, 40/455, 1.5, 906, 124.03, 717

[56] References Cited

U.S. PATENT DOCUMENTS

| | | | |
|---|---|---|---|
| 4,531,310 | 7/1985 | Ascon et al. | 40/455 X |
| 4,791,741 | 12/1988 | Kondo | 40/455 X |
| 5,031,344 | 7/1991 | Goroza | 40/1.5 |
| 5,036,610 | 8/1991 | Fehr | 40/300 |
| 5,063,698 | 11/1991 | Johnson et al. | 40/455 X |
| 5,380,205 | 1/1995 | Bradley et al. | 40/1.5 X |
| 5,570,081 | 10/1996 | Holstrom | 40/300 X |
| 5,577,918 | 11/1996 | Crowell | 40/906 X |

*Primary Examiner*—Brian K. Green

[57] ABSTRACT

A talking pet tag for association with a pet wherein a prerecorded message is easily retrievable by the finder of a lost pet by simply depressing a play button. However, in order to gain access to the recordation mechanism, a cover plate held in place by fasteners such as screws must be removed to record a new message so that accidental loss of a message does not occur. The method of retrieving lost pets using the device is also disclosed.

1 Claim, 1 Drawing Sheet

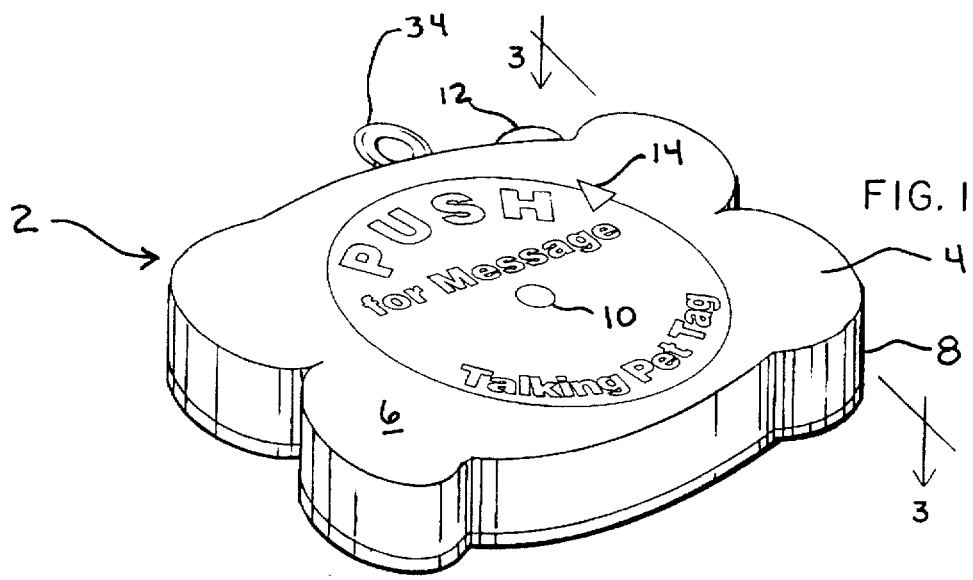
FIG. 1
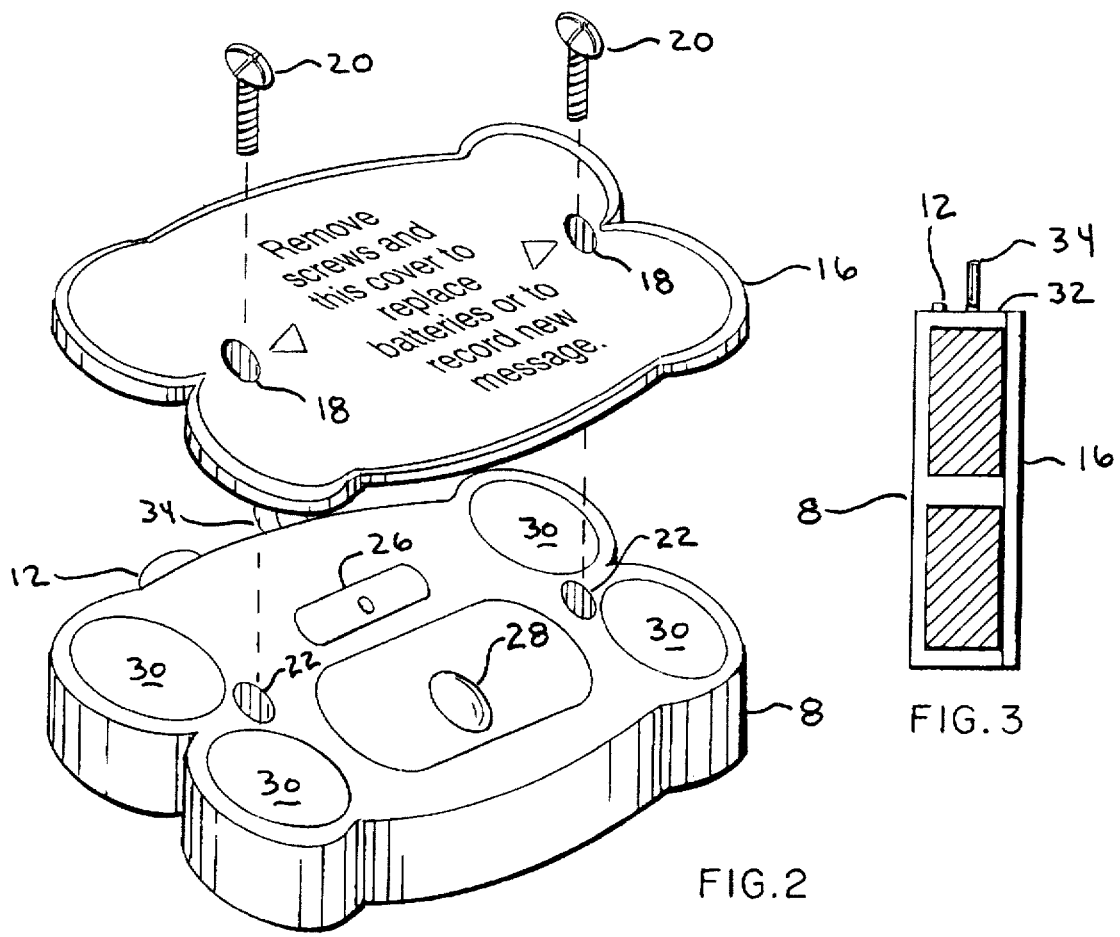
FIG. 2
FIG. 3

IDENTIFICATION DEVICE FOR PETS

BACKGROUND OF THE INVENTION

1. Field of the Invention

This invention relates to an identification tag for pets such that when a lost pet wanders away from its owner's home, a finder of the pet may readily ascertain the pet's owner's address by reason of a recording device fastened to a collar or the like around the pet's neck. By simply pressing a button which is self-evident on the tag, the finder quickly ascertains the pet's owner's home address as well as other recorded information such as the pet's name, etc. The identification tag provides a method whereby a pet owner may record certain information over and over again on the same message chip but must gain access to the recording mode by means that prevent the accidental recordation information except when desired.

2. Description of Related Art

The use of small recording devices, especially for the elderly, are ubiquitous, and have voice chips for recording, and are powered by watch-type batteries such that the owner may easily carry the device in pocket or purse to record and play back information during the course of the day or week. The handy devices are lightweight and permit the recordation of multiple messages over a period of time, and the playing back of the messages when necessary to retrieve information.

However, the devices allow for the recordation of new information over old information, thereby losing and not retaining the old information, and the means of recording over old information is readily assessible to allow the user of the device to record new information.

SUMMARY OF THE INVENTION

The invention relates to a recording device in the shape of a dog biscuit or the like wherein a voice chip records inputted data and the energy source is one or a plurality of watch-like batteries such that the playback of the recorded information is easily obtained, but access to record information is more difficult as by the removal of a faceplate or the like so that accidental recordation over recorded information is not possible except when desired. That is, an accidental recordation resistant means is utilized so that once information is recorded, such as for example, a pet's name and resident address of the pet's owner, this recorded information is easily played back by merely pushing a button to play back the recorded information, but removal of a cover plate, for example, held by screws, is necessary in order to record a new message, as, for example, where a pet owner's residence is changed or a new pet utilizes the device, as will be seen as the description proceeds herein. The disclosed device provides a method whereby a pet owner may safely and confidently allow a pet to run free with the knowledge that should it become lost, a finder will easily be able to determine where the pet belongs.

OBJECTS OF THE INVENTION

It is an object of the invention to provide a pet tag that is readily associated with a pet so that should the pet become lost, a finder will easily determine the pet's residence.

It is another object of the invention to provide a recording device whereby a pet owner may record important information such as the pet's name and resident address, so that should a pet become lost it may be readily returned to its proper owner.

It is still another important object of the invention to provide a recording device that is easily accessible for playing back a recorded message but is not readily accessible, except by design, to record over a prior message or to record the initial message.

It is another important object of the invention to provide a recording device that is easily associated with the collar of a pet and wherein indicia on the device indicates to a finder of the pet steps to take to ascertain the pet's owner and/or residence address.

It is still another important object of the invention to provide a method whereby a pet owner provides a recording device that has recorded a message directing a finder of a lost pet to the pet owner's residence.

These and further objects of the invention will become apparent as the description proceeds herein.

BRIEF DESCRIPTION OF THE DRAWINGS

FIG. 1 is a perspective view of the device of the invention;

FIG. 2 is a view similar to that shown in FIG. 1, but with the back cover removed to illustrate the recording resistant feature of the pet tag; and FIG. 3 is a view taken along the line 3—3 of FIG. 1.

DESCRIPTION OF THE PREFERRED EMBODIMENT

Referring to the drawings, wherein like numerals of reference designate like elements throughout, it will be seen that the tag 2 of the invention comprises what may be termed a ubiquitous message recording device of the conventional-type, which in this particular instance is configured like a dog biscuit or dog bone, wherein the device 2 has a first molded portion 4 comprising a top 6 and side walls 8 with a central aperture 10 through which sound may be readily emitted, as will be seen.

The top 6 has embossed on the surface thereof a limited directive message telling the finder of a lost pet to push button 12, the arrow 14 pointing in the direction of the button 12, so that a recorded message, the pet owner's residence and even the pet's name, may be provided as an outgoing message readily audible by reason of aperture 10.

Referring to FIGS. 2 and 3, it will be seen that a back cover plate 16 is provided having spaced apertures 18 to receive securing fasteners, in this instance, screws 20 into the bores 22 of molded bottom portion 8.

Bottom portion 8 is provided with circuitry, not shown, but which is of the conventional, known type wherein there is provided microphone 26 for receiving a voice message for recordation once record button 28 is activated so that voice chip, not shown, and energized by button cell batteries 30 permit recordation of a message and the playback thereof.

Secured to the top surface 32 by conventional means is eye clasp 34, by which means the talking pet tag 2 may be secured to the collar of a pet by means of a clip-on fastener, not shown.

Because it may be necessary to change a recording, either because the device 2 is being used with a different pet, or the pet owner has moved, one merely removes the fasteners 20 to gain access to the inner compartment of the device 2 to record a new message or to replace batteries, as will be necessary from time to time. Because the back plate 16 is removable with some difficulty, i.e., requiring a screwdriver or the like, a prior recorded message is not easily changed, as in prior art devices, unless and until the owner wants to do so, and thus a recorded message cannot be accidentally changed or recorded over. In the conventional, handheld prior art devices, one may accidentally lose recorded messages by reason of the recordation button being readily accessible, and actuated indiscriminately.

However, with the device 2, accidental recordation or losing of messages is virtually impossible unless and until one actually wants to change the message, which message change necessitates the removal of the fasteners 20 to allow access to record button 28.

Thus, with the disclosed device 2, a pet owner may rest easily that should their pet become lost while wearing the talking pet tag 2, that the pet may be readily returned to the pet owner by reason of the finder of the pet having immediate access to the knowledge as to where the pet owner's residence is located. Obviously, various messages may be recorded including the pet's name, so as to put the lost pet at ease by the finder thereof.

With the device 2, a pet owner initially removes the back plate 16, presses record button 28, and speaks into the microphone 26, to thereby record a selected message onto the voice chip, not shown. Thereafter, the pet owner replaces the fasteners 20, and secures the device 2 to the collar of the pet. The pet, should it become lost for any reason, now carries with it the information necessary for the finder of the pet to return the lost pet to its owner.

Thus, there is disclosed a device and method that allows a pet owner to record a message, and being safe in the realization that the message cannot be readily changed, but can be easily replayed, so as to enable a finder of a lost pet to reunite the lost pet with its owner in a short period of time.

Preferably the material of construction of device 2 and the manner in which it is assembled makes the device 2 impervious to inclement weather conditions. Thus, those of ordinary skill in the art will at once recognize the obvious need of seals, gaskets and materials necessary to obtain this end.

While the invention has been disclosed with specific references to the disclosed device 2, it will be apparent to those of ordinary skill in the art that other means of obtaining the end results will make themselves readily obvious, and still not depart from the spirit and scope of the invention. For example, while the device 2 has been shown to be of molded plastic, or the like, and fasteners 20, along with cover plate 16, are disclosed so as to make it nearly impossible to lose or rerecord unless fully intending to, other means of preventing easy access to recordation will make themselves readily discernable. For example, one may choose other means to prevent accidental recordation of a new message as by having a locking disk or other mechanism to prevent accidental depression of the recording button. This is but one example of various modifications and changes that will make themselves obvious to those of ordinary skill in the art, and all such changes and modifications not departing from the spirit and scope of the invention are intended to be covered by the appended claims.

We claim:

1. A tag incorporating a sound recording device for identification, comprising:

a housing for receiving the sound recording device therein and adapted for securement to an object, said housing having a first push button passing through a side wall thereof, said first push button being operable to initiate a playback of a prerecorded message responsive to a displacement thereof, said housing having an at least partially open side having at least one battery, a microphone and a second push button received therein, said second push button being completely within said housing, said second push button being displaceable to initiate a recording of a message that is to be played back responsive to displacement of said first push button;

a cover overlaying said at least partially open side for forming a closure therefor, said second push button being disposed between a front wall of said housing and said cover for preventing inadvertent displacement of said second push button;

means for securing said cover to said housing requiring a tool for the removal thereof.

* * * * *